Sept. 10, 1968  R. E. KENDALL  3,400,949
TRAILER HITCH WITH VERTICALLY ADJUSTABLE BALL
Filed July 19, 1966  2 Sheets-Sheet 1

Ray E. Kendall
INVENTOR.

Sept. 10, 1968  R. E. KENDALL  3,400,949
TRAILER HITCH WITH VERTICALLY ADJUSTABLE BALL
Filed July 19, 1966  2 Sheets-Sheet 2
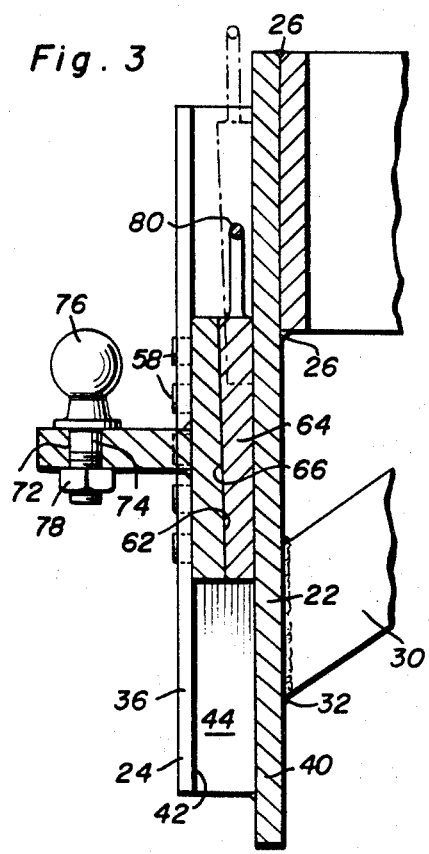
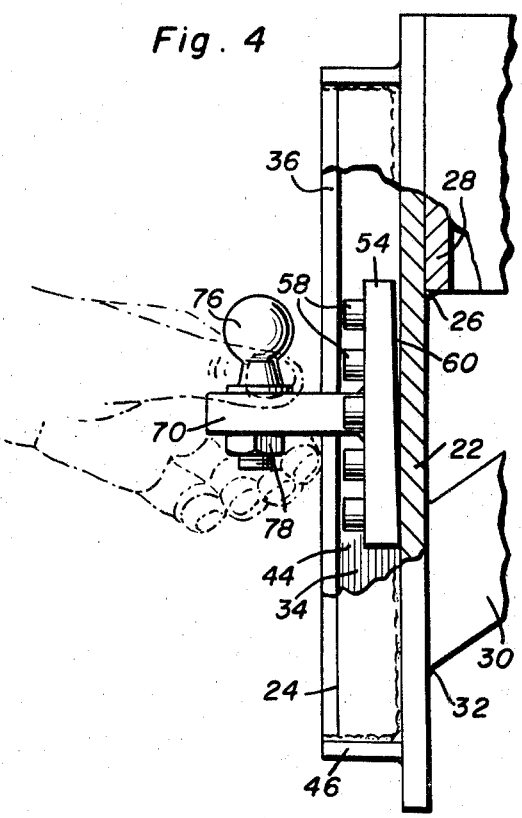
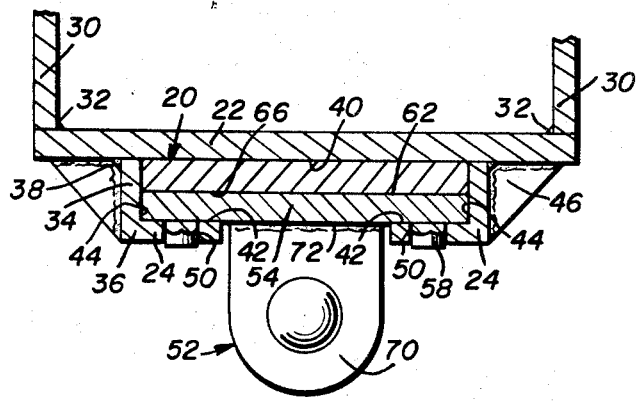
Ray E. Kendall
  INVENTOR.

United States Patent Office 3,400,949
Patented Sept. 10, 1968

3,400,949
TRAILER HITCH WITH VERTICALLY
ADJUSTABLE BALL
Ray E. Kendall, Evergreen Trailer Park,
Alamogordo, N. Mex.
Filed July 19, 1966, Ser. No. 566,418
2 Claims. (Cl. 280—490)

ABSTRACT OF THE DISCLOSURE

An upstanding channel-defining construction including closed and partially open front and rear sides, respectively, adapted to have its closed front side secured to the rear end of a towing vehicle with the partially open rear side opening rearwardly of the towing vehicle. The partially open rear side is defined by a pair of generally parallel upstanding flanges extending toward each other and overlying and spaced rearwardly of the closed front side of the channel-defining structure. The flanges are spaced apart along their adjacent edge portions and have sets of vertically spaced openings formed therein. A hitch member mounting plate is disposed within the channel-defining assembly and includes vertically spaced rearwardly projecting pins along opposite upstanding marginal edge portions thereof removably receivable in the openings formed in the flanges with the plate in one of selected vertically shifted positions within the channel-defining structure and the rear face of the plate abutted against the front faces of the flanges. In addition, the front face of the plate is inclined upwardly and rearwardly and a wedge locking plate is displaceable downwardly in the channel-defining structure between the plate and the closed front side of the channel-defining structure to wedge the plate rearwardly against the flanges and releasably prevent forward displacement of the plate and axial withdrawal of the pins from the openings.

This invention relates to a novel and useful trailer hitch and more specifically to a hitch assembly adapted for securement to a towing vehicle and including a ball element which is vertically adjustable relative to the associated towing vehicle.

The trailer hitch assembly of the instant invention is primarily designed for heavy duty work although the hitch assembly can be utilized for light trailering applications if desired.

The assembly includes a vertically adjustable ball to which a trailer may be operatively coupled in the usual manner. The vertical adjustability of the ball enables the forward extremity of an associated trailer tongue to be varied in elevation. In some instances trailers are provided with trailer tongues whose forward ends are adapted to be mounted in a relatively high position compared to most trailer tongues while some other trailers are provided with forward extremities adapted to be secured to the associated towing vehicle at an elevation lowered relative to the normal position of a trailer tongue.

It is accordingly the main object of this invention to provide a trailer hitch having a vertically adjustable ball wherein substantially all types of trailers including elevated and lowered drawbars or tongues to be trailed behind an associated towing vehicle.

Another object of this invention is to provide a trailer hitch in accordance with the immediately preceding object constructed in a manner whereby an extremely rigid trailer hitch is provided even though the ball element thereof is vertically adjustable.

Still another object of this invention is to provide a trailer hitch including a vertically adjustable ball element which may be readily vertically adjusted to the desired position in a matter of seconds.

A final object of this invention to be specifically enumerated herein is to provide a trailer hitch in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary vertical sectional view taken substantially upon the plane indicated by the section line 3—3 of FIGURE 2;

FIGURE 4 is an enlarged side elevational view of the trailer hitch with portions thereof being broken away and illustrated in longitudinal vertical section and with the wedge member of the hitch assembly removed so as to enable the hitch element to be shifted in vertical position;

FIGURE 5 is a fragmentary horizontal sectional view taken substantially upon a plane passing through the upper extremity of the vertically adjustable ball element and wedge;

Figure 1:
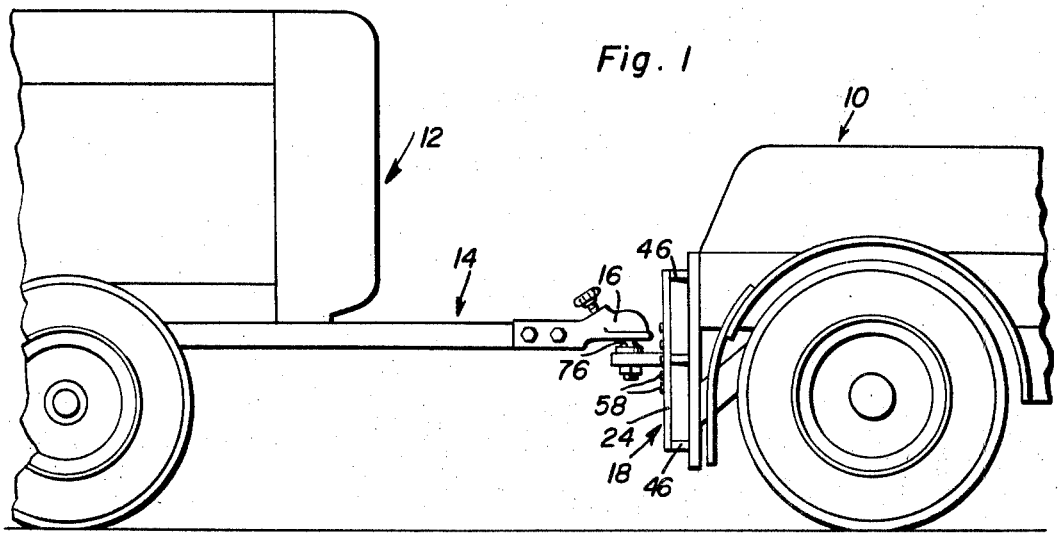
FIGURE 1 is a fragmentary elevational view of the forward end of a trailer vehicle and the rear end of a towing vehicle shown with the tongue of the trailer operatively coupled to the trailer hitch of the instant invention which is supported from the towing vehicle.

Referring now more specifically to the drawings the numeral 10 generally designates a heavy duty towing vehicle and the numeral 12 generally designates a trailer vehicle including a tongue assembly generally referred to by the reference numeral 14. The tongue assembly 14 is provided with a conventional socket hitch assembly 16 on its forward end and the trailer hitch assembly of the instant invention is generally referred to by the reference numeral 18.

Figure 2:
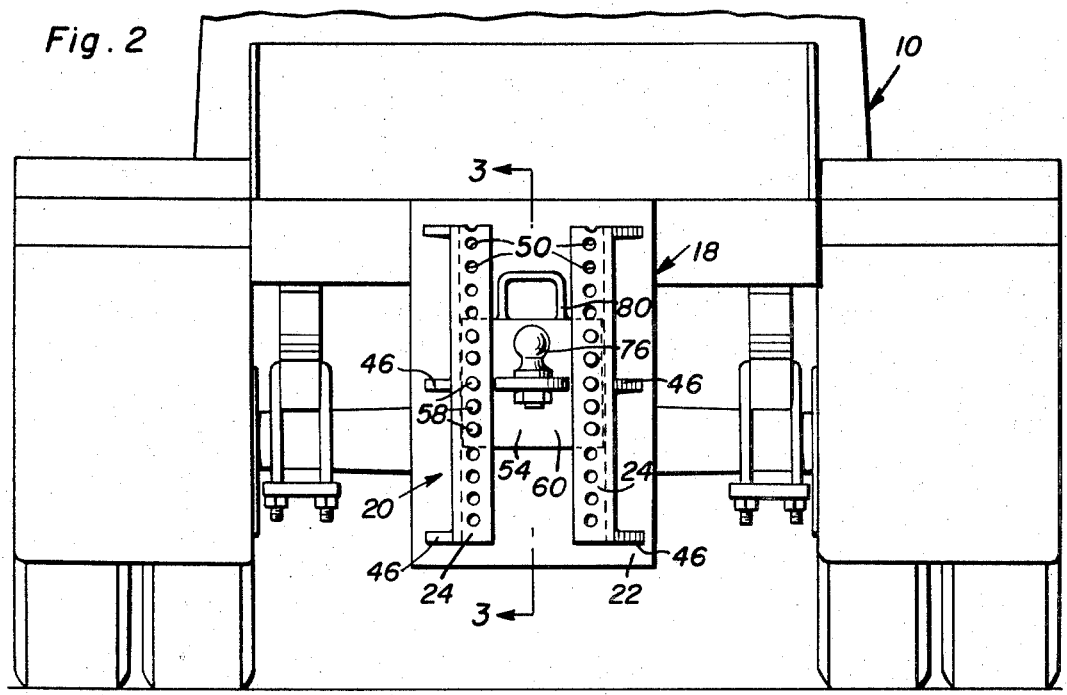
FIGURE 2 is an enlarged fragmentary rear elevational view of the towing vehicle illustrating the trailer hitch of the instant invention centered relative to the transverse width of the towing vehicle.
Figure 6:
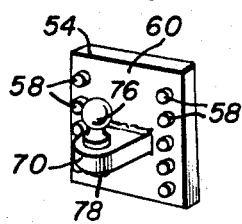
FIGURE 6 is a perspective view of the vertically adjustable ball member.
Figure 7:
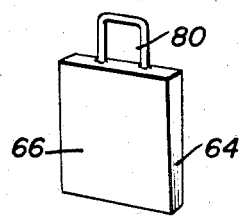
FIGURE 7 is a perspective view of the wedge member.

With attention now invited more specifically to FIGURES 2 through 5 of the drawings, it may be seen that the trailer hitch assembly 18 defines an upstanding tubular guide generally referred to by the reference numeral 20 including a base plate 22 and a pair of L-shaped angle members 24. The base plate 22 may be secured to the vehicle 10 in any convenient manner such as by welding 26 securing the base plate 22 directly to a heavy duty bracing member 28 extending across the rear of the vehicle 10 and inclined bracing members 30 welded to the base plate 22 at one pair of corresponding ends as at 32 and secured to suitable heavy duty bracing members (not shown) carried by the vehicle 10 at their other pair of corresponding ends.

The angle members 24 each include first and second angulated flange portions 34 and 36 and the free edge of edge flange portion 34 is secured to the rear surface of the base plate 22 in any convenient manner such as by welding 38. The flange portions 34 project rearwardly from the plate 22 and terminate at their rear ends in their corresponding flange portions 36 which project laterally toward each other. The rear surface 40 of the base plate 22 and the forward surfaces 42 of the flange portions 36 define opposing wall means of the tubular guide 20. In addition, the opposing surfaces 44 of the flange portions 34 also define opposing walls of the tubular guide 20.

The angle members 24 may be suitably braced by means of triangular gusset plates 46 secured between the upper and lower ends of each angle member 24 and the corresponding marginal edge portions of the base plate 22.

Each of the flange portions 36 is provided with a plurality of vertically spaced apertures 50 and a ball hitch member generally referred to by the reference numeral 52 is provided and includes a mounting plate portion 54 which is disposed within the tubular guide 20 and snugly received between the surfaces 44 and between the surfaces 40 and 42. However, the mounting plate portion 54 may be shifted laterally between limit positions defined by the surfaces 40 and 42.

The mounting plate portion 54 includes a plurality of rod-like projections 58 spaced along each upstanding marginal edge portions of the rear face of the mounting plate portion 54. The projections 58 are selectively receivable in the apertures 50 formed through the flange portions 36, see FIGURES 3 and 5, but are fully retractable from the apertures 50 when the mounting plate portion 54 is displayed forwardly into contact with the rear surface or wall 40 of the base plate 22, see FIGURE 4.

With attention invited now more specifically to FIGURES 3 and 4 of the drawings, it will be seen that the forward face 62 of the mounting plate portion 54 is inclined slightly rearwardly and upwardly so that the mounting plate portion 54 defines a wedge having its major dimension disposed lowermost.

A wedge follower plate 64 is provided and includes a rear surface 66 which is also slightly rearwardly and upwardly inclined and which therefore defines a wedge having its major dimension disposed uppermost. The wedge follower plate 64 is also snugly receivable between the surfaces 44 and between the forward surface 62 of the mounting plate portion 54 and the rear surface 40 when the mounting plate portion 54 is disposed in its rearmost position with the projections 58 projecting through the apertures 50.

The wedging surfaces 62 and 66 are such that downward movement of the wedge follower plate 64 within the tubular guide 20 is limited to a position with the wedge follower plate 64 horizontally registered with the mounting plate portion 54.

The mounting plate portion 54 includes a generally horizontally disposed rearwardly projecting flange 70 secured thereto in any convenient manner such as by welding 72 and which projects through the confronting free edge portions of the flange portions 36. The rear end portion of the flange 70 has a bore 72 formed therethrough and a threaded shank portion 74 of a ball hitch element 76 is secured through the bore 72 by means of a suitable threaded fastener 78.

In operation, and with attention directed to FIGURE 3 of the drawings, when it is desired to vertically adjust the ball hitch element 76, the wedge follower plate 64 is first lifted by means of its bale-type handle 80 to a position slightly above the position thereof illustrated in phantom lines in FIGURE 3. Thereafter, the mounting plate portion 54 may be displaced forwardly toward the base plate 22 in the manner illustrated in FIGURE 4 of the drawings so as to completely retract the rod-like projections 58 from the corresponding apertures 50. Thereafter, the mounting plate portion 54 may be vertically adjusted in the tubular guide 20 as desired and then rearwardly displaced so as to again engage the projections 58 in a corresponding set of the apertures 50. Thereafter, the wedge follower plate 64 may again be lowered to its position forward of and in horizontal alignment with the mounting plate portion 54 with the wedge surfaces or faces 62 and 66 in contacting relation with each other thereby preventing forward movement of the mounting plate portion 54 in the tubular guide 20. It will, of course, be appreciated that the wedge follower plate 64 will tightly wedge the mounting plate portion 54 in its adjusted position and thereby prevent any movement of the mounting plate portion 54 in its adjusted position and thereby prevent any movement of the mounting plate portion 54 relative to the tubular guide.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hitch including upstanding plate means adapted to be secured to the rear of a towing vehicle and defining rearwardly facing upstanding abutment surface portions facing generally in the same horizontal direction, a pair of generally parallel upstanding first flanges supported from said plate means and projecting rearwardly outwardly from said abutment surface portions, said first flanges terminating rearwardly in a pair of upstanding generally parallel spaced apart second flanges extending toward each other and including generally vertically straight abutment faces opposing and generally paralleling said abutment surface portions throughout their vertical extent, said second flanges each including a set of generally horizontal and parallel vertically spaced openings formed therethrough, an upstanding hitch mounting plate portion receivable between said first flanges and between said abutment surface portions and said abutment faces and including bearing surface portions for bearing against said abutment faces, said plate portion also including a set of vertically spaced support pins projecting rearwardly outwardly from each of said bearing surface portions and snugly receivable in associated sets of said openings when said bearing surface portions bear against said abutment faces, said mounting plate portion being shiftable forwardly toward said abutment surface portions a distance sufficient to withdraw said pins from said openings and thereafter being freely shiftable along said flanges for registry of said sets of pins with different sets of said openings, lock plate means snugly receivable between said abutment surface portions and said mounting plate portion for preventing horizontal forward shifting of said mounting plate portion away from a position with said bearing surface portions bearing against said abutment faces and thus withdrawal of said support pins from said openings, said lock plate means being vertically shiftable relative to and between said mounting plate portion and said abutment surface portions and said mounting plate portion and said lock plate means including coacting wedge surface means limiting downward movement of said lock plate means between said mounting plate portion and said abutment surface portions to a lowermost limit position disposed therebetween with said coacting wedge surface means and said abutment surface portions coacting to urge said bearing surface portions tightly against said abutment faces, said mounting plate portion being adapted to have a hitch element secured thereto for vertical shifting with said hitch mounting plate portion between the adjacent edges of said second flanges.

2. The combination of claim 1 wherein said wedge surface means include upstanding generally planar and parallel opposing wedge surfaces on said mounting plate portion and said lock plate means inclined slightly, at their upper ends, toward said abutment faces.

References Cited

UNITED STATES PATENTS

| 2,714,016 | 7/1955 | Smith | 280—418 |
| 2,847,232 | 8/1958 | Graham | 280—490 |
| 3,269,751 | 8/1966 | Whattoff | 280—490 X |

LEO FRIAGLIA, *Primary Examiner.*